May 2, 1944. R. L. SNYDER, JR 2,348,030
SCANNING TYPE OF ELECTRON MICROSCOPE
Filed May 31, 1941
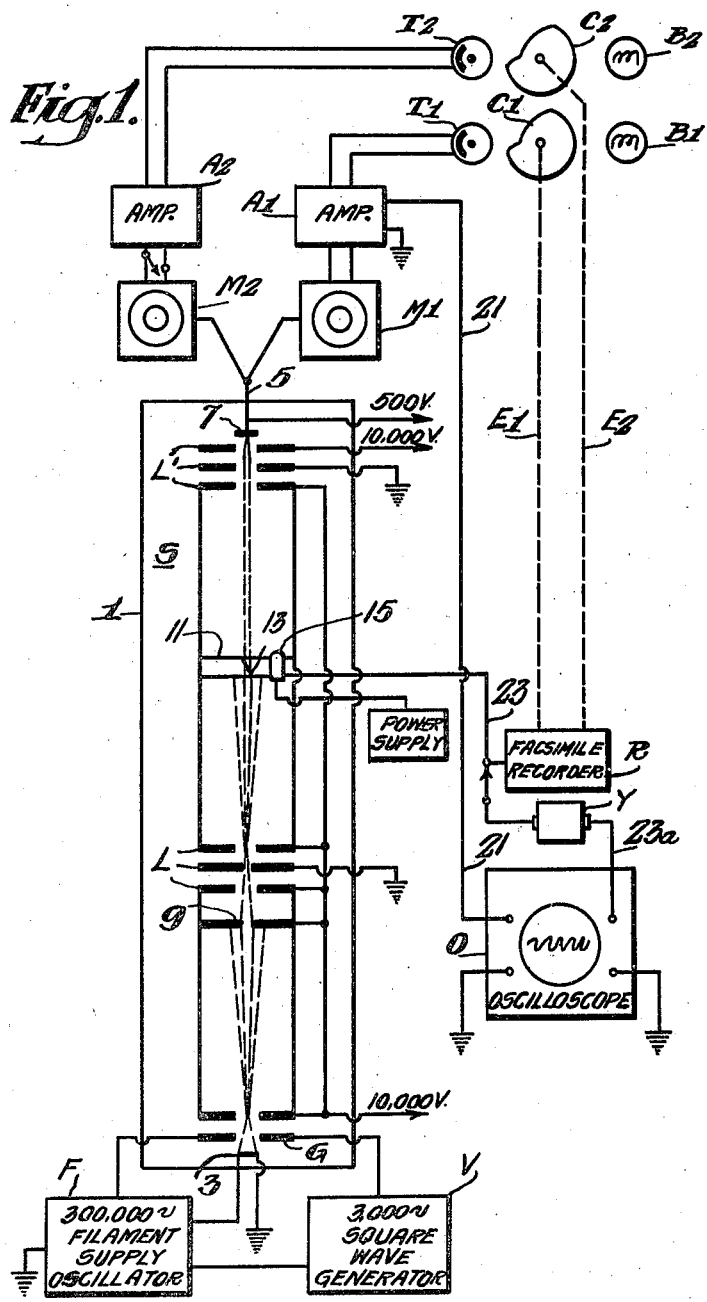
Inventor
Richard L. Snyder, Jr.
By
Attorney Patented May 2, 1944

2,348,030

UNITED STATES PATENT OFFICE 2,348,030

SCANNING TYPE OF ELECTRON MICROSCOPE

Richard L. Snyder, Jr., Glassboro, N. J., assignor to Radio Corporation of America, a corporation of Delaware Application May 31, 1941, Serial No. 396,099

4 Claims. (Cl. 250—49.5)

This invention relates to electron microscopes of the type wherein the specimen under examination is explored or scanned by an electron probe or beam and wherein the primary electrons passing through the specimen, or the secondary electrons emanating from it, are used to actuate a suitable integrating device, such for example as a so-called "facsimile recorder."

It is known to those skilled in the art to which this invention appertains that the resolving power of an electron microscope of the scanning type depends solely on the point-sharpness of the scanning focal spot in the object plane subject to investigation. To put it another way: the smaller the diameter of the beam the better the recorded picture or "micrograph." As pointed out by Von Ardenne (in copending application Ser. No. 190,629, filed February 15, 1938, now U. S. Patent 2,257,774, issued October 7, 1941) optimum results are achieved when the diameter of the electron beam is less than the wave length of light.

One very real difficulty encountered in the operation of a scanning type microscope is that of determining whether or not the electron beam is in focus, i. e., whether or not it is of the smallest possible diameter. The reason for this difficulty resides in the fact that a low scanning speed is necessary in order to limit the signal frequency band width so that a usable signal-to-noise ratio may be attained. The slow scanning speed results in picture recording periods of from (say) fifteen to (say) thirty minutes so that, to retrace a sufficient number of recordings to be sure of optimum focus would consume many hours with possible resultant change in the character of the specimen when subjected to repeated bombardment.

Accordingly, the principal object of the present invention is to provide a method and apparatus for determining quickly and easily whether or not the electron beam or probe of a scanning type microscope is properly focused.

The present invention is predicated upon an appreciation of the fact, and its application to the art of electron microscopy, that when the beam is of the smallest possible diameter the picture signal contains the highest frequencies. The invention therefore contemplates the examination of the picture signal, either before or during the recording interval, as by means of an oscilloscope, electrical filter, or other apparatus capable of indicating the presence of high frequency components in the said signal, and the subsequent adjustment of the focusing system of the microscope to the condition producing the highest observable frequencies.

When a cathode-ray type of oscilloscope is employed, the objects of the invention may be achieved simply by (a) operating its horizontal deflecting means in synchronism with the line scanning mechanism of the microscope, (b) impressing the signal impulses upon the vertical deflecting means, (c) observing the relative sharpness (and/or number) of the undulations in the resulting oscillograph pattern and then adjusting the focusing mechanism of the microscope until the pattern on the oscilloscope exhibits the maximum sharpness or greatest number of undulations.

In the drawing,

Fig. 1 is a schematic view of a scanning type electron microscope similar to that described and claimed by the applicant in the instant case in copending application Serial No. 391,188 (now U. S. Patent 2,330,930, issued October 5, 1943), filed April 30, 1941, and including certain auxiliary apparatus employed in carrying the present invention into effect, Figs. 2 and 3 are diagrammatic views illustrative of the movement of the target with respect to primary electron beams of different diameters and which will be referred to in explaining the principle of the invention, and Figs. 4–7 show various oscilloscope wave patterns indicative of different conditions of focus in the electron microscope of Fig. 1.

The apparatus shown in Fig. 1 comprises an electron microscope indicated, generally, at S, a facsimile recorder R, which may be of standard design, for producing a permanent image or micrograph of the specimen or object under examination in the microscope, and a cathode-ray type oscilloscope O for producing a visible indication of the focusing conditions which obtain during or prior to the recording interval.

The microscope S comprises an elongated evacuable receptacle 1 containing, adjacent one end, an electron-emissive cathode 3 and, adjacent its opposite end, a movable rod-like lever element 5 on the inner end of which an object holder 7 containing an object or specimen (not shown) to be examined is mounted. Intermediate the cathode 3 and object holder 7 is an electron lens system including a first apertured plate 9, a first group of lens elements L, a second apertured plate 11, and a series of objective lens elements L', through all of which electrons pass, in an undeviating path, to the object under examination.

As taught by Von Ardenne, the diameter of the electron beam at the point at which it impinges the object should preferably be less than the wave length of light. The scanning movement necessary to a complete examination of every part of the object is provided by moving the object holder 7 with respect to the beam in a manner later described. Secondary electrons released by impact of the steady primary beam on the moving object travel in the return direction through the objective lens elements L' and impinge a fluorescent target 13 which is preferably provided on the wall surrounding the opening in the plate 11 through which the primary beam passes on its way to the objective lens. A photosensitive amplifier, for example, an electron multiplier 15, mounted adjacent the fluorescent surface 13, picks up the visible or invisible light rays therefrom and generates an augmented electron current proportionate to the intensity of the secondary electron stream from the object. The output of the multiplier, in this case, serves to actuate the facsimile recorder R which is operated in synchronism with the object holder 7 to provide a permanent, enormously magnified image of the surface of the object thus "scanned."

The distance the object is moved by the scanning mechanism must of course, be exceedingly small when a greatly magnified recorded image is desired. To achieve such small movement, mechanically, the lever 5 which supports the object holder 7 may be pivoted close to the object end of the lever and the driving force applied to its opposite or outer end. In an arrangement wherein the specimen is mounted one-half inch from the fulcrum of the lever 5 and the driving force applied five inches from the fulcrum, the resulting reduction of ten to one is satisfactory. In the illustrated arrangement, two dynamic-type loudspeaker motor M1 and M2 are employed for imparting the requisite scanning movement to the object holder 10; one motor (M1) serving to provide the line-scanning movement and the other (M2), the frame-scanning movement. The motors M are actuated through suitable amplifiers A1 and A2 by photo tubes T1 and T2, respectively, which are illuminated by light from two lamps B1 and B2 controlled by rotating spiral shutters or cams C1 and C2, which are driven through a mechanical coupling E1, E2 by the line and frame scanning mechanism of the recorder R. Where the recording equipment employs an auxiliary amplifier (not shown) which requires a carrier frequency, such carrier may be introduced by interrupting the primary beam from the electron gun by impressing an alternating voltage of the desired frequency and wave shape on the control grid of the gun, as indicated at G. A detector shunted by a suitable filter, indicated generally at Y, may be provided if desired to remove the carrier from the signal current supplied to the oscilloscope O. The filament heating current supply is shown provided by a regulated high frequency source F, which is turned on only during the time the beam is cut off by the carrier generator V. Thus, when the beam is "on," no heating current, and hence no disturbing magnetic field or potential, is present while electrons are being emitted.

As previously indicated, the cathode ray oscilloscope O is employed for determining the condition of focus of the primary electron beam in the microscope S. To this end the horizontal deflecting plates (or coils) of the oscilloscope are shown connected as through a lead 21 to the amplifier A1 which supplies the driving current for the line scanning mechanism of the microscope, and the vertical deflecting plates (or coils) are supplied with signal currents from the electron multiplier 15 as through an extension 23a of the lead 23 which supplies signaling current to the recorder R. Ordinarily the oscilloscope will remain in circuit while the recorder R is in operation so that any lack of focus which may develop during the recording interval may be observed and corrected forthwith. However, suitable switches may be provided if desired for disconnecting the recorder during the focusing tests.

The currents supplied to the horizontal deflecting plates of the oscilloscope by the photosensitive amplifier is proportionate to the intensity of the secondary electron stream from the object under examination. Thus, if the primary beam or probe should fail to strike the specimen or other "target" capable of secondary emission there will be no current applied to the said plates. Assuming now that a "target" capable of secondary emission be moved slowly into the field of the beam it will be apparent that the time it takes for the said current to rise from zero to maximum will be a measure of the relative diameter of the primary beam in the microscope. This is visually indicated in Figs. 2 and 3 wherein 7 indicates an object or target capable of secondary emission and X, X1 indicate electron probes of different diameters. Now, obviously, if the target 7 be moved slowly into the field of the larger primary beam X the secondary emission resulting from impact of the beam will exhibit a gradual rise, indicated by the slope of the oscillograph pattern P, Fig. 4, from zero to maximum as more and more of the primary beam is presented to the target. On the other hand, referring now to Figs. 3 and 5, when the primary beam X1 is of substantially smaller diameter, the rise from zero current (just prior to the time the edge of the target contacts the periphery of the beam) to maximum current (when the full area of the beam impinges the target) as the target 7 is moved, at the same rate as before, into the beam X1, will be much more abrupt and may in fact comprise a square top wave similar to the one shown P' in Fig. 5.

Since, as is well known in the art, a "square-top wave" has a large high frequency content in its makeup it will now be apparent that the relative amount of high frequency components in the output current of a scanning type electron microscope provides a useful indication of the focus or point-sharpness of the beam in the object plane subject to investigation.

As a practical matter the foregoing method of determining whether or not the beam or probe in the microscope is properly focused, may be carried out in several different ways either before or after the object to be examined is mounted upon the specimen holder. Thus if the holder itself be secondarily emissive the desired contrast may be achieved by moving an edge of the holder into or out of the beam. Alternatively, if the emissive ratio of the holder under bombardment by the beam is less than or greater than that of the object per se an informative pattern may be achieved by successively moving the holder and the specimen into or out of the path of the beam. In any event the force required to move the holder during the testing interval may be supplied by the motor M1 which normally provides the line scanning movement.

Since ordinarily this movement is not so great as to move the holder out of the range of the beam the intensity of the driving current supplied by the amplifier A1 may be altered to provide the desired degree of movement of the lever arm 5 to which the holder 7 is affixed. Alternatively, the adjustment may be made mechanically by moving the specimen-moving assembly, including the scanning motors, lever and lever fulcrum in the desired direction.

The condition of focus of the microscope primary beam may also be ascertained, in accordance with the invention, without altering the normal arrangement or movement of the specimen with respect to the beam, simply by observing the relative presence or absence of high frequency components in the output current of the microscope during normal operation, e. g., during a recording interval. Thus, with the oscilloscope connected in the manner indicated in Fig. 1 any high frequency components in the oscilloscope pattern may be manifest by sharp minor undulations, indicated at P2, Fig. 6, in the main pattern of the wave. The absence of such sharp minor undulations in the wave pattern P3 of Fig. 7 is indicative of a lack of focus in the primary electron beam of the microscope.

The focus of the beam may be corrected, when necessary, either by changing the relative potential distribution among the lens elements of the electron lens system L, L', or by moving the object holder with respect to the focal spot or crossover point of the electrons on the target-side of the objective lens L'.

As previously indicated, while a cathode ray oscilloscope comprises a convenient medium for detecting high frequency components in the output current of the microscope it will be apparent to those skilled in the art to which this invention appertains that other types of analyzing devices (e. g., a suitable electrical filter) may be employed in carrying the invention into effect. A method involving the use of a suitable high-pass filter circuit for detecting the presence of maximum high frequency components in the signal output, is described and specifically claimed in the copending application of Jan A. Rajchman, Serial No. 441,167, filed April 30, 1942, and assigned to the same assignee as the instant case. Accordingly, it is to be understood that the foregoing is to be interpreted as illustrative and not in a limiting sense except as required by the prior art and by the spirit of the appended claims.

What is claimed is:

1. Method of adjusting the focus of an electron beam in an electron microscope having a signal output circuit through which signal currents containing high frequency components flow, said method comprising detecting the presence of high frequency components in said output circuit and then altering the effective diameter of said beam until the highest obtainable frequency components appear in the signal output current in said circuit.

2. Method of ascertaining and adjusting the focus of an electron beam in an electron microscope having a signal output circuit through which signal currents containing high frequency components flow, said method comprising detecting the presence of high frequency components in the signal output current in said circuit, and then decreasing the effective diameter of said beam adjacent to the object plane under investigation until the highest obtainable frequency components are detected in said signal output current.

3. Method of ascertaining and adjusting the focus of an electron beam in an electron microscope having a signal output circuit through which signal currents containing high frequency components flow, said method comprising deflecting an auxiliary cathode ray horizontally at a certain sweep rate, deflecting said ray vertically in accordance with the intensity of the electron stream from the object under examination whereby said cathode ray traces a wave pattern, and then altering the diameter of said electron beam until the highest obtainable frequency components appear in said cathode ray pattern.

4. Method of ascertaining and adjusting the focus of the electron beam in a scanning type electron microscope having a signal output circuit through which signal currents containing high frequency components flow and employing a line and frame scanning mechanism operating in synchronism with the line and frame scanning mechanism of an associated image recorder, said method comprising deflecting a cathode ray horizontally at a sweep rate corresponding to the line scanning rate of said scanning mechanisms, deflecting said ray vertically in accordance with the intensity of the electron stream from the object under examination, whereby said ray traces a wave pattern, and then altering the diameter of said electron beam until the highest obtainable frequency components appear in said cathode ray pattern.

RICHARD L. SNYDER, Jr.